UNITED STATES PATENT OFFICE.

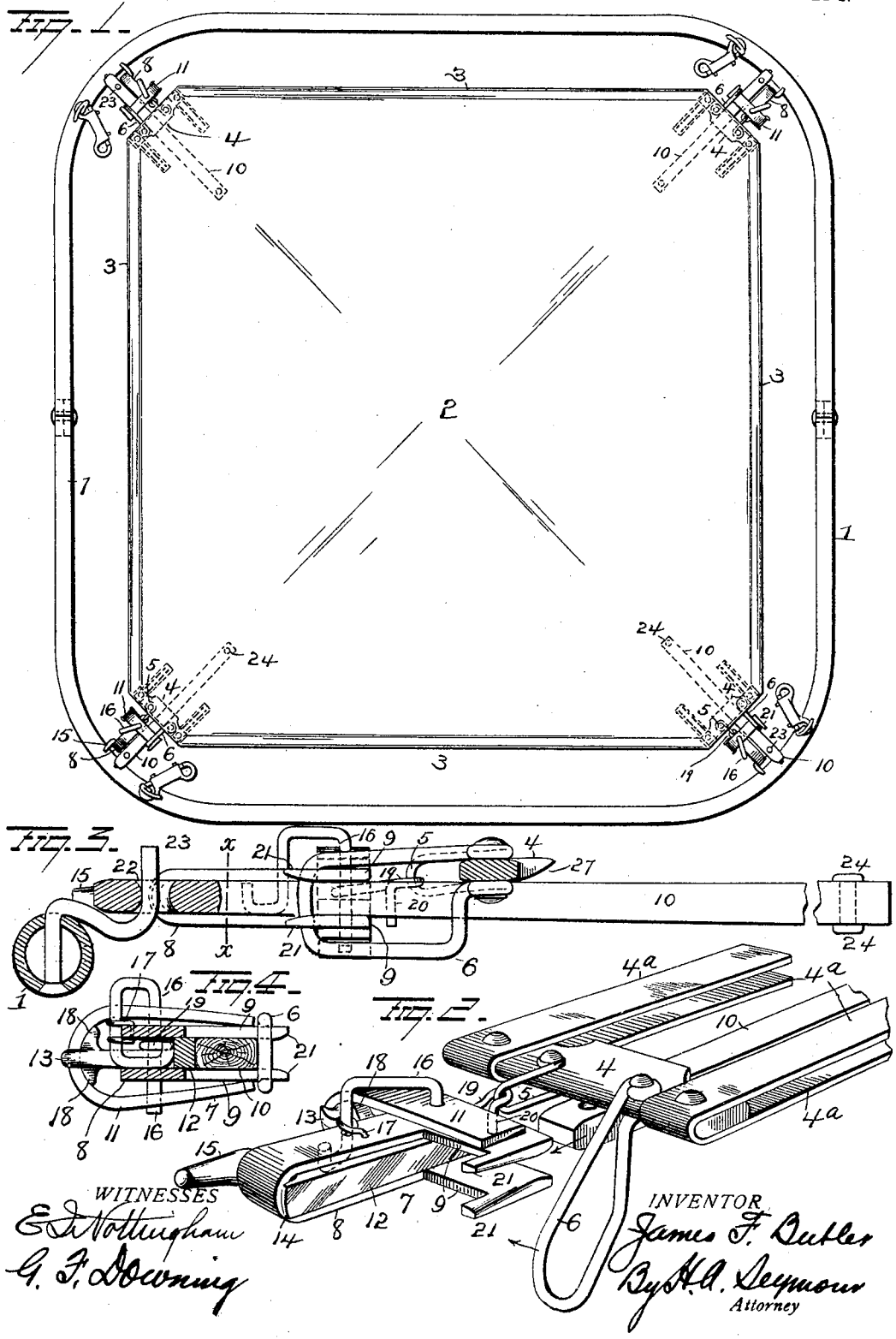

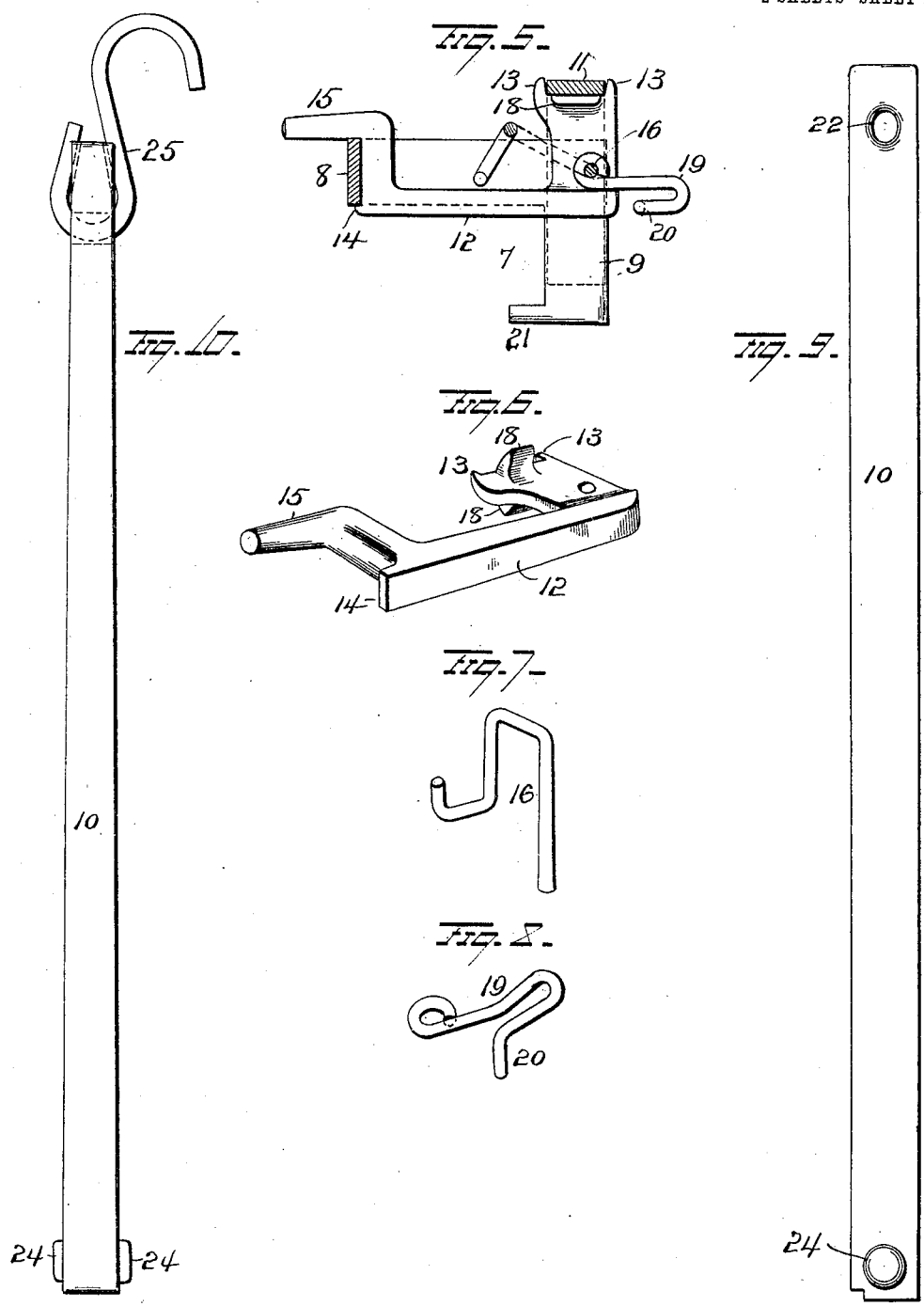

JAMES F. BUTLER, OF SCRANTON, PENNSYLVANIA.

FIRE-ESCAPE.

No. 810,615. Specification of Letters Patent. Patented Jan. 23, 1906.

Application filed May 19, 1904. Serial No. 208,693.

*To all whom it may concern:*

Be it known that I, JAMES F. BUTLER, of Scranton, in the county of Lackawanna and State of Pennsylvania, have invented certain new and useful Improvements in Fire-Escapes; and I do hereby declare the following to be a full, clear, and exact description of the invention, such as will enable others skilled in the art to which it appertains to make and use the same.

My invention relates to an improvement in fire-escapes, and more particularly to that class of escapes designed to receive persons jumping from burning structures where no other safe means of exit is afforded.

The object of the invention is to provide means whereby the blanket or net is so supported that it gives or yields under the pressure of a falling body, thereby preventing the rebound which would occur if the blanket or net were rigidly supported or supported on springs.

With these ends in view my invention consists in a frame and a net or blanket connected thereto by a series of frictional devices which yield with gradually-increasing resistance.

My invention further consists in the parts and combinations of parts, as will be more fully described, and pointed out in the claims.

In the accompanying drawings, Figure 1 is a plan view of a fire-escape constructed in accordance with and embodying my invention. Fig. 2 is a detached view of one of the friction-yokes, showing its attachment to the blanket or net and also showing the manner of introducing the wedge-shaped bar. Fig. 3 is a view in longitudinal section of one of the friction devices, the wedge-shaped bar thereof being shown connected up with the frame of the fire-escape. Fig. 4 is a view in section on the line $xx$ of Fig. 3. Fig. 5 is a view in longitudinal section of one of the friction-yokes. Figs. 6, 7, and 8 represent detached parts of the friction-yoke, and Figs. 9 and 10 are detached views of the wedge-shaped bar.

1 represents a frame, preferably constructed in two parts, hinged together so as to fold in a small compass, and it may be of any desired shape and size, according to the general outline of the device. In the construction illustrated the frame is approximately square with rounded corners and is composed of two sections or halves hinged together, so as to fold one upon the other.

The blanket 2 may be of canvas, duck, or other suitable stout material, or, if desired, a net of any suitable material may be employed in lieu thereof, the outer edge of the blanket or net being suitably reinforced, as at 3. To each of the four corners of blanket or net 2 is rigidly secured a metal plate 4. This plate 4 is secured at its ends to straps 4$^a$, which are preferably made of leather and embrace the opposite faces of the blanket or net and are secured thereto by rivets or stitching. Each plate 4 is beveled, as shown at 27, so as to permit of its free passage over the upper lug on the free or thickest end of the wedge-shaped bar and is provided near one end with a small laterally-swinging loop 5 and near its opposite end with a laterally-swinging locking-bail 6.

The friction-yokes 7 each comprise a double L-shaped spring-plate 8, bent into U-shape form, so as to bring its two shorter members 9 9 in line and parallel with each other. These shorter members 9 9 are designed to receive between them the wedge-shaped bar 10 and bear on the latter with a yielding pressure. The members 9 9 of the yoke are beveled at their rear portions, as shown in Fig. 2, so as to allow them to take bearing gradually on the grade of the wedge. The members 9 9 are beveled from the path of the wedge to their ends at their side opening and slightly beveled at their front ends for the purpose of allowing the wedge to be disengaged readily from the clamp. These shorter members 9 9 of the yoke are reinforced by the U-shaped spring 11, the free ends of which terminate near the free ends of the shorter members 9 9 of spring-plate 8.

12 is a metal frame located within the U-shaped yoke and projecting therefrom at the side adjacent to the shorter members 9 9 of said yoke to form a guide and bearing for the wedge-shaped bar 10. This frame is provided at one end with the projecting lips 13 13, which overlap the opposite edges of the reinforcing-spring 11, and is provided at its opposite end with a lip 14, adapted to overlap one edge of the U-shaped yoke 7, and with an elongated hook 15, overlapping the opposite edge, which hook also serves as a finger-hold for assisting the operator in removing the wedge-shaped bar out of engagement with the shorter members 9 9 of spring-plate 8. The reinforcing-spring 11, plate 8, and frame 12 are all secured together by the pintle 16, which is curved inwardly, as shown, toward the space between the two members of plate 8 and is locked against movement by the wire 17. This frame 12 is provided on its top and bottom faces adjacent to the projecting lips 13 13 with the shoulders or stops 18 18 for engaging the inner face of the reinforcing-spring 11 at its head, whereby the reinforcing-spring is prevented from exerting pressure upon the shorter members 9 9 of spring-plate 8, except at its free ends.

Mounted on pintle 16 is a hook 19, through the medium of which the friction-yoke 7 is connected with the swinging loop 5, carried by plate 4. This hook 19 is provided with a laterally-projecting arm 20, adapted to be engaged by the wedge-shaped bar 10 when the latter is moved to withdraw itself from the yoke, thus preventing the hook from riding on top of the wedge.

Several sets of wedge-shaped bars 10 may be provided with each apparatus, and by having the taper or thickness of the wedge-shaped bars of one set vary from that of the other sets a number of different adjustments of the apparatus can be provided. Each of the wedge-shaped bars is provided near its smaller end with a hole 22 to receive the hook 23, carried by frame 1, and near its opposite end with the lugs 24 24, one on top and one on the bottom face thereof.

Any number of the friction devices above described may be employed for connecting the frame and blanket or net together, the number varying according to the size and shape of the apparatus; but for ordinary use I prefer to employ an apparatus of the form shown and described, wherein but four friction devices are employed, one at each corner of the frame.

In assembling the apparatus each friction device is grasped with one hand and the wedge-shaped bar in the other and the parts brought to the position shown in Fig. 2, the thinner end of the wedge-shaped bar being located with relation to the friction device, as shown in Fig. 2. By now forcing the wedge-shaped bar forwardly in the direction of the arrow the smaller end of the wedge-shaped bar enters between the members 9 9 of the yoke, which members are made wedge shape in section, and spreads the members apart, the friction between said parts increasing as the wedge-shaped bar 10 moves between the members 9 9. After the wedge-shaped bar has passed until the hole 22 therein is in line with the outer end of the yoke it is then locked against lateral displacement by the locking-bail 6, which is swung over the hooks 21 and engages the members 9 9, as shown in Fig. 3. After the wedge-shaped bar is thus locked it is hooked over the hook 23, carried by the frame 1. It is of course understood that the several friction devices are each connected up simultaneously, and when so connected up the apparatus is ready to be supported by its frame at such a height that the blanket or net will not be brought in contact with the ground by the weight falling therein. As before explained, these bars 10 are wedge-shaped, and a gradually-increasing power is required to move the friction-yoke when thus applied on the wedge-shaped bars. When the apparatus is in position to receive a falling body, the greater portion of the wedge-shaped bars is to the rear of the friction-yokes, and as the body strikes the blanket or net the yokes are pulled along the wedge-shaped bars with a gradually-increasing resistance until the entire shock has been absorbed by the wedges and yokes or until the parts are brought to a state of rest by the engagements of the lugs 24 24 on the wedge-shaped bars with the shorter members 9 9 of the yokes.

It will be seen from this construction and operation of the parts that by providing the wedge-shaped bars with more or less taper the friction or power required to cause the yokes to slide on the bars can be regulated to a nicety, thus adjusting the apparatus for heavy or light weights and for long and short jumps.

Each apparatus can be provided with a series of varying wedge-shaped bars which may be adjusted within a very few moments, thus permitting of the substitution of one set for another, as occasion may require. When the body has landed in the blanket or net, it is instantly removed and wedge-shaped bars 10 uncoupled from the frame 1. After the wedge-shaped bars have been detached from the frame the loops or locking-bails 6 are unlocked to the open position shown in Fig. 2. By then grasping hook 15 of the yoke with one hand and the extended end of the wedge-shaped bar with the other and then moving them away from each other the wedge-shaped bars will be disconnected from the friction-yokes and ready to be reinserted, as already explained.

The frame 1 is provided with several snap-hooks 28, and when the apparatus is not in use and the half-sections comprising the frame are folded one upon the other the blanket or net and parts carried thereby may be temporarily locked to the frame by the snap-hooks engaging the swinging bails 6. The wedge-shaped bars may either be retained in their respective friction-yokes or stored in a convenient place.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. A friction device for a fire-escape, comprising a wedge and spring members embracing said wedge and adapted to move thereon.

2. The combination with a frame, and a blanket or net, of friction devices connecting the blanket or net to the frame and operating to prevent rebound of the blanket or net.

3. A fire-escape comprising a blanket or net, a support, a wedge, and spring members embracing said wedge and adapted to move thereon, said wedge and spring members disposed between the blanket and support.

4. The combination with a frame and a blanket or net, of a series of two-part friction devices for connecting the blanket or net to the frame, one part of each friction device being wedge-shaped in longitudinal section and embraced by the other part.

5. The combination with a frame and a blanket or net, of a series of connecting devices, each comprising a wedge-shaped bar and a yoke, the latter embracing said wedge and adapted to move thereon.

6. The combination with a frame and a blanket or net, of a series of connecting devices, each comprising a wedge-shaped bar having means at one end for its attachment to the frame and a stop at its opposite end, and a yoke embracing the wedge and adapted to move thereon.

7. The combination with a frame and a blanket or net, of a series of devices connecting said parts, each connecting device comprising a wedge-shaped bar and a spring-yoke to engage the sides of the bar and a U-shape reinforcing-spring engaging the yoke near its free ends.

8. A connecting device for fire-escapes, comprising a spring clamp or yoke, a rigid frame located between the members of said yoke, a reinforcing-spring engaging the members of said yoke, and a wedge-shaped bar adapted to be engaged by the yoke.

9. A connecting device for fire-escapes, comprising a spring clamp or yoke having two L-shaped members, a rigid frame located between the members of said yoke, a reinforcing-spring engaging the members of said spring-yoke, means for securing said parts together, a wedge-shaped bar adapted to be engaged by the members of the spring-yoke, and means for connecting the wedge and yoke to the blanket and frame.

10. A connecting device for fire-escapes comprising a spring clamp or yoke having its two members made with laterally-projecting portions, a rigid frame located between the members of said spring-yoke and provided with a handle or grip, and a wedge-shaped bar adapted to rest between the laterally-projecting portions of the members of said yoke.

11. The combination with a frame, a blanket or net, and a series of plates secured to said blanket or net, each plate being provided with loops, of a spring-yoke having means for engaging the loops on the plate, a wedge-shaped bar engaging said spring yielding yoke and means for connecting the wedge-shaped bar to the frame.

In testimony whereof I have signed this specification in the presence of the subscribing witnesses.

JAMES F. BUTLER.

Witnesses:
C. A. FREES,
MARGARET MARTIN,
JAMES J. O'MALLEY.